United States Patent
Burmaster et al.

(10) Patent No.: US 11,155,657 B2
(45) Date of Patent: *Oct. 26, 2021

(54) ARTICLES HAVING IMPROVED CLARITY, PREPARED FROM PROPYLENE-ETHYLENE COPOLYMERS

(71) Applicant: FINA TECHNOLOGY, INC., Houston, TX (US)

(72) Inventors: Douglas Burmaster, Houston, TX (US); Owen Hodges, Houston, TX (US); J. Layne Lumus, Dickinson, TX (US); Lu Ann Kelly, Friendswood, TX (US); Mark Murphy, Beach City, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 92 days.

This patent is subject to a terminal disclaimer.

(21) Appl. No.: 16/547,347

(22) Filed: Aug. 21, 2019

(65) Prior Publication Data

US 2019/0375864 A1    Dec. 12, 2019

Related U.S. Application Data

(60) Division of application No. 14/986,089, filed on Dec. 31, 2015, now Pat. No. 10,428,166, which is a division of application No. 13/458,019, filed on Apr. 27, 2012, now Pat. No. 9,328,182, which is a continuation of application No. 11/012,499, filed on Dec. 15, 2004, now abandoned.

(51) Int. Cl.
*C08F 210/06* (2006.01)
*C08F 210/16* (2006.01)
*C08J 5/00* (2006.01)
*C08L 23/14* (2006.01)

(52) U.S. Cl.
CPC .......... *C08F 210/06* (2013.01); *C08F 210/16* (2013.01); *C08J 5/00* (2013.01); *C08J 2323/16* (2013.01); *C08L 23/142* (2013.01); *Y10T 428/1352* (2015.01); *Y10T 428/1397* (2015.01)

(58) Field of Classification Search
None
See application file for complete search history.

(56) References Cited

U.S. PATENT DOCUMENTS 10,428,166 B2 * 10/2019 Burmaster ................. C08J 5/00

* cited by examiner

*Primary Examiner* — Monica A Huson
(74) *Attorney, Agent, or Firm* — Albert Shung

(57) ABSTRACT

Molded articles are prepared from propylene-ethylene copolymers and exhibiting improved clarity and strength properties. Articles prepared include bottles and other thin-walled articles. The articles are prepared using an isotactic propylene-ethylene random copolymer resin having an ethylene content of from about 0.5 to about 3 percent by total weight of copolymer, with a xylene solubles content of less than about 1.5 percent. The injection molded article may exhibit less than about 20 percent haze, as determined by ASTM D1003, at a thickness of about 0.08 inch (2.03 mm). Articles may also be prepared from similar copolymers having an ethylene content greater than about 3 percent by total weight of copolymer, with a xylene solubles content of less than about 4 percent by total weight of copolymer. These articles may exhibit less than about 13 percent haze, as determined by ASTM D1003, at a thickness of about 0.08 inch (2.03 mm).

7 Claims, No Drawings

ARTICLES HAVING IMPROVED CLARITY, PREPARED FROM PROPYLENE-ETHYLENE COPOLYMERS

CROSS-REFERENCE TO RELATED APPLICATIONS

This application is a Divisional of U.S. patent application Ser. No. 14/986,089, filed on Dec. 31, 2015, which is a Divisional of U.S. patent application Ser. No. 13/458,019, filed on Apr. 27, 2012, now issued U.S. Pat. No. 9,328,182 issued May 3, 2016; which is a Continuation of U.S. patent application Ser. No. 11/012,499, filed on Dec. 15, 2004, now abandoned; the entireties of which are incorporated herein by reference for all purposes.

BACKGROUND OF THE INVENTION

1. Technical Field

The invention relates generally to propylene polymers, and in particular to articles prepared from propylene-ethylene copolymers.

2. Background of the Art

Propylene-based polymers are popularly used in a number of thermoplastic processing operations. These operations include, for example, injection molding to produce relatively thin-walled products. These polymers have conventionally been prepared via Ziegler-Natta catalysis, and the result has been found to be suitable for a wide variety of applications. However, some applications have indicated a need for improved properties, such as higher impact strength, lower melt temperatures, and higher clarity than has been conventionally attained in polypropylene. In order to obtain these properties those skilled in the art have learned that incorporation of a proportion of ethylene, to form propylene-ethylene random copolymers, offers some of these advantages, as well as, in some cases, greater flexibility and increased toughness.

Despite these improvements, however, there is still a need in the art for propylene-based polymers that exhibit, in particular, still greater improvements in clarity. This is because a number of the applications for which the propylene-ethylene random copolymers are particularly well-suited are also applications where transparency or a relatively high degree of translucency is desirable. These applications include, for example, bottles, which require high clarity as well as high toughness. One approach to obtaining such improvement in clarity has involved the use of so-called clarity-enhancing agents. These agents may be added to the molten polymer during pelletization, for example, or just prior to injection of the polymer into the mold. The clarity-enhancing agents generally operate by providing sites within the polymer for crystallization, which enables formation of smaller crystallites. Since smaller crystallites result in diffraction or reflection of light, ensuring smaller crystallites reduces such occurrence, with the result that clarity is increased. Unfortunately, use of clarity-enhancing agents may increase the cost of preparing and using the polymers, and increasing their levels beyond a certain point may not be feasible or desirable because of potential detriment to other properties of the polymer.

Thus, what is desired in the art are articles prepared from propylene-ethylene random copolymers that exhibit improved clarity, with or without use of clarifying agents, and which also exhibit desirable levels of other physical properties such as toughness, flexibility, impact strength, and the like.

SUMMARY OF THE INVENTION

In one embodiment the invention is an article comprising an isotactic propylene-ethylene random copolymer having an ethylene content of from about 0.5 to about 3 percent by total weight of copolymer. This propylene-ethylene random copolymer may have a xylene solubles content of less than about 1.5 percent by total weight of copolymer, and is suitable to form an injection molded article exhibiting less than about 20 percent haze, as determined by ASTM D1003, at a thickness of about 0.08 inch (2.03 mm).

In another embodiment the invention is an article prepared from an isotactic propylene-ethylene random copolymer having an ethylene content of greater than about 3 percent by total weight of copolymer and a xylene solubles content of less than about 4 percent by total weight of copolymer. This polymer is capable of forming an injection molded article exhibiting less than about 13 percent haze, as determined by ASTM D1003, at a thickness of about 0.08 inch (2.03 mm).

The articles may be prepared by a variety of methods, including but not limited to injection molding.

DETAILED DESCRIPTION OF THE INVENTION

In one embodiment it has been found that articles exhibiting improved clarity may be prepared from certain propylene-ethylene copolymers that also offer maintenance or improvement in physical properties such as melt flow rate. When these copolymers are used in various applications, including preparation of injection molded articles, these copolymers impart improved quality, particularly to commercially desirable thin-walled structures such as bottles and the like.

In one embodiment the propylene-ethylene copolymers are prepared using a catalyst selected from certain metallocene catalysts. Metallocene catalysts may be characterized generally as coordination compounds incorporating one or more cyclopentadienyl (Cp) groups (which may be substituted or unsubstituted, each substitution being the same or different) coordinated with a transition metal through n bonding The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst is a bulky ligand metallocene compound generally represented by the formula:

where L is a bulky ligand, A is a leaving group, M is a transition metal and m and n are such that the total ligand valency corresponds to the transition metal valency. For example m may be from 1 to 3 and n may be from 1 to 3.

The metal atom "M" of the metallocene catalyst compound, as described throughout the specification and claims, may be selected from Groups 3 through 12 atoms and lanthanide Group atoms in one embodiment; and selected from Groups 3 through 10 atoms in a more particular embodiment, and selected from Sc, Ti, Zr, Hf, V, Nb, Ta, Mn, Re, Fe, Ru, Os, Co, Rh, Ir, and Ni in yet a more particular embodiment; and selected from Groups 4, 5 and 6 atoms in yet a more particular embodiment, and Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are electrically neutral, unless otherwise indicated.

The bulky ligand generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

Cp typically includes 7-bonded and/or fused ring(s) or ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof, and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

Other non-limiting examples of leaving groups include amines, phosphines, ethers, carboxylates, dienes, hydrocarbon radicals having from 1 to carbon atoms, fluorinated hydrocarbon radicals (e.g., $-C_6F_5$ (pentafluorophenyl)), fluorinated alkylcarboxylates (e.g., $CF_3C(O)O^-$), hydrides and halogen ions and combinations thereof. Other examples of leaving groups include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more leaving groups form a part of a fused ring or ring system.

L and A may be bridged to one another. A bridged metallocene, for example may, be described by the general formula:

$$XCp^ACp^BMA_n$$

wherein X is a structural bridge, $Cp^A$ and $Cp^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, $R_2C=$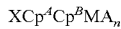, $R_2Si=$, —Si(R)₂Si(R₂)—, R₂Ge═, RP═ (wherein "═" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more Rs may be joined to form a ring or ring system. In one embodiment, the bridged metallocene catalyst component has two or more bridging groups (X).

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl.

In another embodiment, the bridging group may also be cyclic, and include 4 to 10 ring members or 5 to 7 ring members in a more particular embodiment. The ring members may be selected from the elements mentioned above, and/or from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be cis-, trans-, or a combination thereof.

The cyclic bridging groups may be saturated or unsaturated and/or carry one or more substituents and/or be fused to one or more other ring structures. If present, the one or more substituents are selected from the group hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group of those having 4 to 10 ring members, more particularly 5, 6 or 7 ring members (selected from the group of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

In one embodiment, the metallocene catalyst includes CpFlu Type catalysts (e.g., a metallocene incorporating a substituted Cp fluorenyl ligand structure) represented by the following formula:

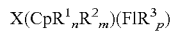

wherein Cp is a cyclopentadienyl group, Fl is a fluorenyl group, X is a structural bridge between Cp and Fl, $R^1$ is a substituent on the Cp, n is 1 or 2, $R^2$ is a substituent on the Cp at a position which is proximal to the bridge, m is 1 or 2, each $R^3$ is the same or different and is a hydrocarbyl group having from 1 to 20 carbon atoms with $R^3$ being substituted on a nonproximal position on the fluorenyl group and at least one other $R^3$ being substituted at an opposed nonproximal position on the fluorenyl group and p is 2 or 4.

In yet another aspect, the metallocene catalyst includes bridged mono-ligand metallocene compounds (e.g., mono cyclopentadienyl catalyst components). In this embodiment, the at least one metallocene catalyst component is a bridged "half-sandwich" metallocene catalyst. In yet another aspect of the invention, the at least one metallocene catalyst component is an unbridged "half sandwich" metallocene.

Described another way, the "half sandwich" metallocenes above are described in U.S. Pat. Nos. 6,069,213, 5,026,798, 5,703,187, and 5,747,406, including a dimer or oligomeric structure, such as disclosed in, for example, U.S. Pat. Nos. 5,026,798 and 6,069,213, which are incorporated by reference herein.

Non-limiting examples of metallocene catalyst components consistent with the description herein include:
cyclopentadienylzirconium$A_n$,
indenylzirconium$A_n$,
(1-methylindenyl)zirconium$A_n$,
(2-methylindenyl)zirconium$A_n$,
(1-propylindenyl)zirconium$A_n$,
(2-propylindenyl)zirconium$A_n$,
(1-butylindenyl)zirconium$A_n$,
(2-butylindenyl)zirconium$A_n$,
methylcyclopentadienylzirconium$A_n$,
tetrahydroindenylzirconium$A_n$,
pentamethylcyclopentadienylzirconium$A_n$,
cyclopentadienylzirconium$A_n$,
pentamethylcyclopentadienyltitanium$A_n$,
tetramethylcyclopentyltitanium$A_n$,
(1,2,4-trimethylcyclopentadienyl)zirconium$A_n$,
dimethylsilyl(1,2,3,4-tetramethylcyclopentadienyl)(cyclopentadienyl)zirconium$A_n$,
dimethylsilyl(1,2,3,4-tetramethylcyclopentadienyl)(1,2,3-trimethylcyclopentadienyl)zirconium$A_n$,
dimethylsilyl(1,2,3,4-tetramethylcyclopentadienyl)(1,2-dimethylcyclopentadienyl)zirconium$A_n$,
dimethylsilyl(1,2,3,4-tetramethylcyclopentadienyl)(2-methylcyclopentadienyl)zirconium$A_n$,
dimethylsilylcyclopentadienylindenylzirconium$A_n$,
dimethylsilyl(2-methylindenyl)(fluorenyl)zirconium$A_n$,
diphenylsilyl(1,2,3,4-tetramethylcyclopentadienyl)(3-propylcyclopentadienyl)zirconium$A_n$,
dimethylsilyl(1,2,3,4-tetramethylcyclopentadienyl)(3-t-butylcyclopentadienyl)zirconium$A_n$,
dimethylgermyl(1,2-dimethylcyclopentadienyl)(3-isopropylcyclopentadienyl)zirconium$A_n$,
dimethylsilyl(1,2,3,4-tetramethylcyclopentadienyl)(3-methylcyclopentadienyl)zirconium$A_n$,
diphenylmethylidene(cyclopentadienyl)(9-fluorenyl)zirconium$A_n$,
diphenylmethylidenecyclopentadienylindenylzirconium$A_n$,
isopropylidenebiscyclopentadienylzirconium$A_n$,
isopropylidene(cyclopentadienyl)(9-fluorenyl)zirconium$A_n$,
isopropylidene(3-methylcyclopentadienyl)(9-fluorenyl)zirconium$A_n$,
ethylenebis(9-fluorenyl)zirconium$A_n$,
mesoethylenebis(1-indenyl)zirconium$A_n$,
ethylenebis(1-indenyl)zirconium$A_n$,
ethylenebis(2-methyl-1-indenyl)zirconium$A_n$,
ethylenebis(2-methyl-4,5,6,7-tetrahydro-1-indenyl)zirconium$A_n$,
ethylenebis(2-propyl-4,5,6,7-tetrahydro-1-indenyl)zirconium$A_n$,
ethylenebis(2-isopropyl-4,5,6,7-tetrahydro-1-indenyl)zirconium$A_n$,
ethylenebis(2-butyl-4,5,6,7-tetrahydro-1-indenyl)zirconium$A_n$, ethylenebis(2-isobutyl-4,5,6,7-tetrahydro-1-indenyl)zirconium$A_n$,
dimethylsilyl(4,5,6,7-tetrahydro-1-indenyl)zirconium$A_n$,
diphenyl(4,5,6,7-tetrahydro-1-indenyl)zirconium$A_n$,
ethylenebis(4,5,6,7-tetrahydro-1-indenyl)zirconium$A_n$,
dimethylsilylbis(cyclopentadienyl)zirconium$A_n$,
dimethylsilylbis(9-fluorenyl)zirconium$A_n$,
dimethylsilylbis(1-indenyl)zirconium$A_n$,
dimethylsilylbis(2-methylindenyl)zirconium$A_n$,
dimethylsilylbis(2-propylindenyl)zirconium$A_n$,
dimethylsilylbis(2-butylindenyl)zirconium$A_n$,
diphenylsilylbis(2-methylindenyl)zirconium$A_n$,
diphenylsilylbis(2-propylindenyl)zirconium$A_n$,
diphenylsilylbis(2-butylindenyl)zirconium$A_n$,
dimethylgermylbis(2-methylindenyl)zirconium$A_n$,
dimethylsilylbistetrahydroindenylzirconium$A_n$,
dimethylsilylbistetramethylcyclopentadienylzirconium$A_n$,
dimethylsilyl(cyclopentadienyl)(9-fluorenyl)zirconium$A_n$,
diphenylsilyl(cyclopentadienyl)(9-fluorenyl)zirconium$A_n$,
diphenylsilylbisindenylzirconium$A_n$,
cyclotrimethylenesilyltetramethylcyclopentadienylcyclopentadienylzirconium$A_n$,
cyclotetramethylenesilyltetramethylcyclopentadienylcyclopentadienylzirconium$A_n$,
cyclotrimethylenesilyl(tetramethylcyclopentadienyl)(2-methylindenyl)zirconium$A_n$,
cyclotrimethylenesilyl(tetramethylcyclopentadienyl)(3-methylcyclopentadienyl)zirconium$A_n$,
cyclotrimethylenesilylbis(2-methylindenyl)zirconium$A_n$,
cyclotrimethylenesilyl(tetramethylcyclopentadienyl)(2,3,5-trimethylclopentadienyl)zirconium$A_n$,
cyclotrimethylenesilylbis(tetramethylcyclopentadienyl)zirconium$A_n$,
dimethylsilyl(tetramethylcyclopentadieneyl)(N-tertbutylamido)titanium$A_n$,
biscyclopentadienylchromium$A_n$,
biscyclopentadienylzirconium$A_n$,
bis(n-butylcyclopentad ienyl)zirconium$A_n$,
bis(n-dodecycicyclopentadienyl)zirconium$A_n$,
bisethylcyclopentadienylzirconium$A_n$,
bisisobutylcyclopentadienylzirconium$A_n$,
bisisopropylcyclopentadienylzirconium$A_n$,
bismethylcyclopentadienylzirconium$A_n$,
bisnoxtylcyclopentadienylzirconium$A_n$,
bis(n-pentylcyclopentadienyl)zirconium$A_n$,
bis(n-propylcyclopentadienyl)zirconium$A_n$,
bistrimethylsilylcyclopentadienylzirconium$A_n$,
bis(1,3-bis(trimethylsilyl)cyclopentadienyl)zirconium$A_n$,
bis(1-ethyl-2-methylcyclopentadienyl)zirconium$A_n$,
bis(1-ethyl-3-methylcyclopentadienyl)zirconium$A_n$,
bispentamethylcyclopentadienylzirconium$A_n$,
bispentamethylcyclopentadienylzirconium$A_n$,
bis(1-propyl-3-methylcyclopentadienyl)zirconium$A_n$,
bis(1-n-butyl-3-methylcyclopentadienyl)zirconium$A_n$,
bis(1-isobutyl-3-methylcyclopentadienyl)zirconium$A_n$,
bis(1-propyl-3-butylcyclopentadienyl)zirconium$A_n$,
bis(1,3-n-butylcyclopentadienyl)zirconium$A_n$,
bis(4,7-dimethylindenyl)zirconium$A_n$,
bisindenylzirconium$A_n$,
bis(2-methylindenyl)zirconium$A_n$,
cyclopentadienylindenylzirconium$A_n$,
bis(n-propylcyclopentadienyl)hafnium$A_n$,
bis(n-butylcyclopentadienyl)hafnium$A_n$,
bis(n-pentylcyclopentadienyl)hafnium$A_n$,
(n-propylcyclopentadienyl)(n-butylcyclopentadienyl)hafnium$A_n$,
bis[(2-trimethylsilylethyl)cyclopentadienyl]hafnium$A_n$,
bis(trimethylsilylcyclopentadienyl)hafnium$A_n$,
bis(2-n-propylindenyl)hafnium$A_n$,
bis(2-n-butylindenyl)hafnium$A_n$,
dimethylsilylbis(n-propylcyclopentadienyl)hafnium$A_n$,
dimethylsilylbis(n-butylcyclopentadienyl)hafnium$A_n$,
bis(9-n-propylfluorenyl)hafnium$A_n$,
bis(9-n-butylfluorenyl)hafnium$A_n$,
(9-n-propylfluorenyl)(2-n-propylindenyl)hafnium$A_n$,
bis(1-n-propyl-2-methylcyclopentadienyl)hafnium$A_n$,
(n-propylcyclopentadienyl)(1-n-propyl-3-n-butylcyclopentadienyl)hafnium$A_n$,
dimethylsilyltetramethylcyclopentadienylcyclopropylamidotitanium$A_n$,
dimethylsilyltetramethylcyclopentadienylcyclobutylamidotitanium$A_n$,
dimethylsilyltetramethylcyclopentadienylcyclopentylamidotitanium$A_n$,
dimethylsilyltetramethylcyclopentadienylcyclohexylamidotitanium$A_n$,
dimethylsilyltetramethylcyclopentadienylcycloheptylamidotitanium$A_n$,
dimethylsilyltetramethylcyclopentadienylcyclooctylamidotitanium$A_n$,
dimethylsilyltetramethylcyclopentadienylcyclononylamidotitanium$A_n$,
dimethylsilyltetramethylcyclopentadienylcyclodecylamidotitanium$A_n$,
dimethylsilyltetramethylcyclopentadienylcycloundecylamidotitanium$A_n$,
dimethylsilyltetramethylcyclopentadienylcyclododecylamidotitanium$A_n$,
dimethylsilyltetramethylcyclopentadienyl(sec-butylamido)titanium$A_n$,
dimethylsilyl(tetramethylcyclopentadienyl)(n-octylamido)titanium$A_n$,
dimethylsilyl(tetramethylcyclopentadienyl)(n-decylamido)titanium$A_n$,
dimethylsilyl(tetramethylcyclopentadienyl)(n-octadecylamido)titanium$A_n$,
methylphenylsilyltetramethylcyclopentadienylcyclopropylamidotitanium$A_n$,
methylphenylsilyltetramethylcyclopentadienylcyclobutylamidotitanium$A_n$,
methylphenylsilyltetramethylcyclopentadienylcyclopentylamidotitanium$A_n$,
methylphenylsilyltetramethylcyclopentadienylcyclohexylamidotitanium$A_n$,
methylphenylsilyltetramethylcyclopentadienylcycloheptylamidotitanium$A_n$,
methylphenylsilyltetramethylcyclopentadienylcyclooctylamidotitanium$A_n$,
methylphenylsilyltetramethylcyclopentadienylcyclononylamidotitanium$A_n$,
methylphenylsilyltetramethylcyclopentadienylcyclodecylamidotitanium$A_n$,
methylphenylsilyltetramethylcyclopentadienylcycloundecylamidotitanium$A_n$,
methylphenylsilyltetramethylcyclopentadienylcyclododecylamidotitanium$A_n$,
methylphenylsilyl(tetramethylcyclopentadienyl)(sec-butylamido)titanium$A_n$,
methylphenylsilyl(tetramethylcyclopentadienyl)(n-octylamido)titanium$A_n$,
methylphenylsilyl(tetramethylcyclopentadienyl)(n-decylamido)titanium$A_n$,
methylphenylsilyl(tetramethylcyclopentadienyl)(n-octadecylamido)titanium$A_n$, diphenylsilyltetramethylcyclopentadienylcyclopropylamidotitanium$A_n$,
diphenylsilyltetramethylcyclopentadienylcyclobutylamidotitanium$A_n$,
diphenylsilyltetramethylcyclopentadienylcyclopentylamidotitanium$A_n$,
diphenylsilyltetramethylcyclopentadienylcyclohexylamidotitanium$A_n$,
diphenylsilyltetramethylcyclopentadienylcycloheptylamidotitanium$A_n$,
diphenylsilyltetramethylcyclopentadienylcyclooctylamidotitanium$A_n$,
diphenylsilyltetramethylcyclopentadienylcyclononylamidotitanium$A_n$,
diphenylsilyltetramethylcyclopentadienylcyclodecylamidotitanium$A_n$,
diphenylsilyltetramethylcyclopentadienylcycloundecylamidotitanium$A_n$,
diphenylsilyltetramethylcyclopentadienylcyclododecylamidotitanium$A_n$,
diphenylsilyl(tetramethylcyclopentadienyl)(sec-butylamido)titanium$A_n$,
diphenylsilyl(tetramethylcyclopentadienyl)(n-octylamido)titanium$A_n$,
diphenylsilyl(tetramethylcyclopentadienyl)(n-decylamido)titanium$A_n$,
diphenylsilyl(tetramethylcyclopentadienyl)(n-octadecylamido)titanium$A_n$,
and derivatives thereof.

As used herein, the term "metallocene activator" is defined to be any compound or combination of compounds, supported or unsupported, which may activate a single-site catalyst compound (e.g., metallocenes, Group 15 containing catalysts, etc.) Typically, this involves the abstraction of at least one leaving group (A group in the formulas/structures above, for example) from the metal center of the catalyst component. The catalyst components of the present invention are thus activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators", or any other compound that may convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO"), and alkylaluminum compounds as activators, to activate desirable metallocenes described herein. MAO and other aluminum-based activators are well known in the art. Non-limiting examples of aluminum alkyl compounds which may be utilized as activators for the catalysts described herein include trimethylaluminum, triethylaluminum, triisobutylaluminum, tri-n-hexylaluminum, tri-n-octylaluminum and the like.

Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds, and mixtures thereof (e.g., tri(n-butyl)ammonium tetrakis(pentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one embodiment, the three groups are independently selected from the group of halogen, mono or multicyclic (including halosubstituted) aryls, alkyls, and alkenyl compounds and mixtures thereof. In another embodiment, the three groups are selected from the group alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from the group alkyls having 1 to 4 carbon groups, phenyl, naphthyl and mixtures thereof. In yet another embodiment, the three groups are selected from the group highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

Illustrative, not limiting examples of ionic ionizing activators include trialkyl-substituted ammonium salts such as: triethylammoniumtetraphenylboron,
tripropylammoniumtetraphenylboron,
tri(n-butyl)ammoniumtetraphenylboron,
trimethylammoniumtetra(p-tolyl)boron,
trimethylammoniumtetra(o-tolyl)boron,
tributylammoniumtetra(pentafluorophenyl)boron,
tripropylammoniumtetra(o, p-dimethylphenyl)boron,
tributylammoniumtetra(m,m-dimethylphenyl)boron,
tributylammoniumtetra(p-tri-fluoromethylphenyl)boron,
tributylammoniumtetra(pentafluorophenyl)boron,
tri(n-butyl)ammoniumtetra(o-tolyl)boron, and the like;
N,N-dialkylanilinium salts such as:
N,N-dimethylaniliniumtetraphenylboron,
N, N-diethylaniliniumtetraphenylboron,
N,N-2,4,6-pentamethylaniliniumtetraphenylboron and the like;
dialkyl ammonium salts such as:
diisopropylammoniumtetrapentafluorophenylboron,
dicyclohexylammoniumtetraphenylboron and the like;
triaryl phosphonium salts such as:
triphenylphosphoniumtetraphenylboron,
trimethylphenylphosphoniumtetraphenylboron,
tridimethylphenylphosphoniumtetraphenylboron and the like, and their aluminum equivalents.

In yet another embodiment, an alkylaluminum may be used in conjunction with a heterocyclic compound. The ring of the heterocyclic compound may include at least one nitrogen, oxygen, and/or sulfur atom, and includes at least one nitrogen atom in one embodiment. The heterocyclic compound includes 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituents groups may also be substituted with halogens, particularly fluorine or bromine, or heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl.

In one embodiment, the heterocyclic compound is unsubstituted. In another embodiment one or more positions on the heterocyclic compound are substituted with a halogen atom or a halogen atom containing group, for example a halogenated aryl group. In one embodiment the halogen is selected from the group consisting of chlorine, bromine and fluorine, and selected from the group consisting of fluorine and bromine in another embodiment, and the halogen is fluorine in yet another embodiment.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5,-dimethylpyrroles, 3-pentafluorophenylpyrrole, 4,5,6,7-tetrafluoroindole or 3,4-difluoropyrroles.

In one embodiment, the heterocyclic compound described above is combined with an alkyl aluminum or an alumoxane to yield an activator compound which, upon reaction with a catalyst component, for example a metallocene, produces an active polymerization catalyst. Non-limiting examples of alkylaluminums include trimethylaluminum, triethylaluminum, triisobutylaluminum, tri-n-hexylaluminum, tri-n-octylaluminum, tri-iso-octylaluminum, triphenylaluminum, and combinations thereof.

Other activators include those described in WO 98/07515 such as tris (2,2',2"-nonafluorobiphenyl) fluoroaluminate, which is incorporated by reference herein. Combinations of activators are also contemplated by the invention, for example, alumoxanes and ionizing activators in combinations. Other activators include aluminum/boron complexes, perchlorates, periodates and iodates including their hydrates; lithium (2,2'-bisphenyl-ditrimethylsilicate)-4T-HF; silylium salts in combination with a non-coordinating compatible anion. Also, methods of activation such as using radiation, electro-chemical oxidation, and the like are also contemplated as activating methods for the purposes of rendering the neutral metallocene-type catalyst compound or precursor to a metallocene-type cation capable of polymerizing olefins. Other activators or methods for activating a metallocene-type catalyst compound are described in for example, U.S. Pat. Nos. 5,849,852, 5,859,653 and 5,869,723 and WO 98/32775.

In general, the activator and catalyst component(s) are combined in mole ratios of activator to catalyst component from 1000:1 to 0.1:1 in one embodiment, and from 300:1 to 1:1 in a more particular embodiment, and from 150:1 to 1:1 in yet a more particular embodiment, and from 50:1 to 1:1 in yet a more particular embodiment, and from 10:1 to 0.5:1 in yet a more particular embodiment, and from 3:1 to 0.3:1 in yet a more particular embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 2,000:1 in a more particular embodiment. When the activator is a neutral or ionic ionizing activator such as a boron alkyl and the ionic salt of a boron alkyl, the mole ratio of activator to catalyst component ranges from 0.5:1 to 10:1 in one embodiment, and from 1:1 to 5:1 in yet a more particular embodiment.

More particularly, the molar ratio of Al/metallocene-metal (Al from MAO) ranges from 40 to 500 in one embodiment, ranges from 50 to 400 in another embodiment, ranges from 60 to 300 in yet another embodiment, ranges from 70 to 200 in yet another embodiment, ranges from 80 to 175 in yet another embodiment; and ranges from 90 to 125 in yet another embodiment, wherein a desirable molar ratio of Al(MAO) to metallocene-metal "M" may be any combination of any upper limit with any lower limit described herein.

The activators may or may not be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) *CHEMICAL REVIEWS* 1347-1374 (2000).

Metallocene Catalysts may be supported or unsupported. Typical support materials may include talc, inorganic oxides, clays and clay minerals, ion-exchanged layered compounds, diatomaceous earth compounds, zeolites or a resinous support material, such as a polyolefin.

Specific inorganic oxides include silica, alumina, magnesia, titania and zirconia, for example. The inorganic oxides used as support materials may have an average particle size of from 30 microns to 600 microns, or from 30 microns to 100 microns, a surface area of from 50 $m^2/g$ to 1,000 $m^2/g$, or from 100 $m^2/g$ to 400 $m^2/g$, a pore volume of from 0.5 cc/g to 3.5 cc/g, or from 0.5 cc/g to 2 cc/g.

Desirable methods for supporting metallocene ionic catalysts are described in U.S. Pat. No. 5,643,847; Ser. Nos. 09/184,358 and 09/184,389, which are incorporated by reference herein. The methods generally include reacting neutral anion precursors that are sufficiently strong Lewis acids with the hydroxyl reactive functionalities present on the silica surface such that the Lewis acid becomes covalently bound.

When the activator for the metallocene supported catalyst composition is a NCA, desirably the NCA is first added to the support composition followed by the addition of the metallocene catalyst. When the activator is MAO, desirably the MAO and metallocene catalyst are dissolved together in solution. The support is then contacted with the MAO/metallocene catalyst solution. Other methods and order of addition will be apparent to those skilled in the art Those skilled in the art will appreciate that modifications in the above generalized preparation method may be made without altering the outcome. Therefore, it will be understood that additional description of methods and means of preparing the catalyst are outside of the scope of the invention, and that it is only the identification of the prepared catalysts, as defined herein, that is necessarily described herein.

The copolymers may be prepared via conventional polymerization processes such as are well known in the art. Examples of such polymerization processes include slurry, liquid-bulk and gas-phase polymerizations. In slurry polymerization processes, polymerization occurs in the presence of a solvent, e.g. hexane, within a loop or continuous stirred tank reactor. Polymerization may also be carried out by bulk-phase polymerization, where liquid propylene and ethylene serve as both monomer and diluent. In a typical bulk process, one or more loop reactors are generally employed.

In other embodiments the copolymer may be produced by gas phase polymerization of propylene and ethylene, which is typically carried out in a fluidized bed reactor. Polymer fluff or powder produced from the polymerization reaction is removed from the reactor and may then be processed via conventional techniques, such as by extrusion, to produce the desired copolymer pellets.

The amount of ethylene monomer used during polymerization of the copolymer is desirably in proportion to the desired final ethylene content of the target propylene-ethylene copolymer. In some embodiments the ethylene content may range from about 0.01 to about 10 percent by weight of the copolymer as a whole, more desirably from about 0.1 to about 8 percent by weight, and most desirably from 0.5 to 5 percent by weight. In other embodiments effective levels of ethylene may range from 0.5 to 2 percent, and in still others from 1 to 2 percent, based on total weight of the copolymer.

The selected metallocene catalyst may provide a propylene-ethylene random copolymer having lower xylene solubles content, as compared to those copolymers of the same ethylene content prepared from conventional Ziegler-Natta catalysts. "Xylene solubles content" is defined as that proportion of the copolymer as a whole that is soluble in xylene. Since characterization as isotactic generally indicates insolubility of the polymer in xylene, it is believed that certain chain defects within a predominantly isotactic chain, and/or very low molecular weight chains, are the cause of a minor portion of the polymer being xylene-soluble. Thus, a reduced xylene solubles content implies increased isotacticity and therefore increased crystallinity, which in turn indicates improved clarity.

In particular, the xylene solubles content for the random copolymers, having an ethylene content desirably from about 0.5 to about 3 percent by total weight of copolymer, more desirably from about 0.5 to about 2 percent by total weight of copolymer, may total less than about 2 percent. In various embodiments a xylene solubles content of about 1.5 or less by weight of copolymer may be attained. In embodiments where the ethylene content is greater than about 3 percent by weight of copolymer, for example, from about 3 to about 5 percent by weight, a xylene solubles content of from about 2 to about 3 percent may be attained.

The propylene-ethylene copolymers may be characterized as having a molecular weight distribution, defined as weight average molecular weight divided by number average molecular weight (Mw/Mn), that may be narrower than that of similar copolymers prepared using conventional catalysts. Desirably the molecular weight distribution of the resins may be less than about 5, more particularly from about 2 to about 4. The relatively narrower molecular weight distribution may in some embodiments contribute to the reduced xylene solubles content and, therefore, also to the improvements in clarity attainable herein.

Because of their desirable properties, the copolymers may be particularly suitable for injection molding applications. These properties may include a melt flow rate (MF) of from about 0.1 g/10 min to about 150 g/10 min, with from about 10 to about 60 g/10 min being typical, and from about 15 to about 30 g/10 min being more typical, as determined by ASTM D-1238, Procedure B. Unless otherwise indicated, all melt flow rates presented herein are measured according to ASTM D-1238, Procedure B.

Significantly, the copolymers may exhibit improved clarity (also referred to as reduction in haze) without unacceptable loss in mechanical properties such as tensile strength, flexural modulus and notched Izod impact strength. In particular, as much as a 40 percent reduction in haze may be achieved without significant detriment to such properties, as compared to the haze performance of copolymers of the same or similar melt flow rate and ethylene content that have been prepared by other methods such as via conventional Ziegler-Natta catalysis. Such improvement may render the copolymers particularly desirable for use in preparing injection molded or extruded films, sheets and other products which similarly include relatively closely-spaced parallel surfaces such as walls. These products may include, for example, injection molded bottles and other containers.

In preparing injection molded articles, the copolymer may be introduced, along with any selected additives, into an injection molding unit. Here it may be simultaneously mixed, heated and pressurized until the desired final melt temperature, viscosity and pressure are obtained. Typically, the final melt temperature prior to injection is from about 340 to about 600° F. (171-315° C.), with pressures ranging from about 100 to about 30,000 psi (0.7-207 mPa). The pressurized molten polymer is then injected through an injection nozzle into a mold having a mold cavity of the desired shape. Once the molten copolymer has cooled and solidified within the mold, the mold is opened to release the molded article. The process may then be repeated. Where walls are included in the structure, their thicknesses in many typical applications may desirably range from about 0.01 (0.254 mm), desirably 0.02 (0.501 mm), to about 0.25 inch (6.35 mm), but may in some embodiments be thicker.

While the copolymers may exhibit improved clarity, even without use of conventional clarity-enhancing agents, it is still possible to include such clarity-enhancing agents for even greater clarity improvement. When used they are preferably in an amount of from about 0-0.01 to about 0.75 percent by total weight of resin. As used herein, the expression "clarity-enhancing agent" may include those categorized as either clarifying agents and/or as nucleating agents. Suitable clarifying agents include the acetals of sorbitols and xylitols as well as phosphate ester salts. Many such clarifying agents are disclosed in U.S. Pat. No. 5,310,950, which is incorporated herein by reference. Specific examples of acetals of sorbitols include (p-methylbenzylidene) sorbitol and 2,4 bis (3,4-dimethyldibenzylidene) sorbitol. Examples of suitable commercially available sorbitol-acetal clarifying agents are those designated as Millad 3940 and Millad 3988, both available from Milliken Chemical, Spartanburg, S.C. Specific examples of phosphate ester salts include 2,2-methylene-bis(4,6-ditertbutylphenyll) phosphate, and aluminum hydroxybis (2,4,8,10-tetrakis (1,1-dimethyl) 6-hydroxy-12H-dibenzo [d, g] [1,2,3] [dioxaphophocin 6-oxidato]. Examples of commercially available phosphate ester salts for use as clarifying agents include ADK stabilizer NA-11A and ADK Stabilizer NA-21, both available from Amfine Chemical Corp., Allendale, N.J. Combinations of any of the above may also be employed.

If a clarifying agent will be used for a given application, it is desirably in an amount of at least about 0.01 percent by weight of copolymer. More desirably the clarifying agent is used in an amount of from 0.05 to about 0.75, still more desirably from about 0.10 to about 0.5, and most desirably from about 0.15 to about 0.3, percent by weight of copolymer. The clarifying agent, along with other additives, may be added to the copolymer during extrusion or prior to injecting molding.

In some embodiments a clarity-enhancing agent selected from the category known as nucleating agents may also or optionally be employed. While frequently used, these additives are often somewhat less effective than the clarifying agents. Suitable nucleating agents may include minerals such as talc, aromatic carboxylic salts, dicarboxylic acid salts, and combinations of these and/or of the clarifying agents. Sorbitol acetals and phosphate ester salts, discussed hereinabove, may also act as effective nucleating agents. Specific examples of aromatic carboxylic salts may include sodium benzoate and lithium benzoate, while dicarboxylic acid salts may include cis-endo-bicyclo-heptane-2,3-dicarboxylic acid disodium salt.

Nucleating agents may desirably be employed in amounts of from about 0.01 to 0.75 percent by weight of the copolymer, with from about 0.05 to about 0.50 percent by weight being more typical. More typically the nucleating agent is used in an amount of from 0.01 to about 0.75 percent by weight, still more typically from about 0.05 to about 0.5 percent by weight, and most typically from about 0.10 to about 0.5 percent by weight of copolymer. Where combinations of nucleating agents and clarifying agents are used, similar weight percentages, as combined, are desirable.

The attainable clarity performance of the copolymers will thus depend upon whether or not one or more clarity-enhancing agents are employed and the performance and proportion of such agents, as well as the ethylene content of the copolymer, its xylene solubles content, its melt flow rate, and the thickness of the article in which it is being used. For example, in some embodiments injection molded articles formed from copolymers which have an ethylene content of from about 0.5 to about 3 percent by weight, and which have been modified with clarity-enhancing agents, may exhibit a haze value of less than about 20 percent at a thickness of about 0.08 inch (2.03 mm). Further improvements may be seen for embodiments where the copolymer has a similar ethylene content, but a lower melt flow rate. In these cases the melt flow rate is desirably less than about 20 g/10 min or less, more desirably about less than about 15 g/10 min, and still more desirably from about 7 g/10 min to about 15 g/10 min. In such embodiments an injection molded article exhibiting less than about 13 percent haze at a thickness of about 0.08 inch (2.03 mm) may be obtained.

Desirable performance for the copolymers may also be seen in embodiments where the copolymer has a relatively higher ethylene content, in particular, greater than about 3 percent by weight, desirably from about 3 to about 5 percent by total weight of the copolymer, and a xylene solubles content of less than about 4 percent by weight. In such cases the invention may provide an injection molded article exhibiting less than about 13 percent haze at a thickness of about 0.08 inch (2.03 mm). Copolymers of similar ethylene content, but with a lower melt flow rate, in particular, a melt flow rate of less than about 20 g/10 min, and more desirably from about 7 g/10 min to about 15 g/10 min, may provide an injection molded article exhibiting less than about 10 percent haze at a thickness of about 0.08 inch (2.03 mm).

With respect to other physical properties, additional improvements may be attained. For example, in some embodiments an copolymer that has a melt flow rate of greater than about 20 g/10 min may also exhibit a flexural modulus of less than about $2.25 \times 10^5$ psi, (1551 mPa) as determined by ASTM D790-97. In other embodiments, those having a melt flow rate of greater than 20 g/10 min may exhibit a flexural modulus of less than $1.5 \times 10^5$ psi (1034 mPa), as determined by ASTM D790-97.

Examples of articles and products that may be prepared using the propylene-ethylene random copolymers include injection molded products, such as housewares, food storage containers, cooking utensils, plates, cups, measuring cups, drinking cups, strainers, turkey basters, non-food storage containers, filing cabinets and particularly clear drawers used in such cabinets, and general storage devices, such as organizers, totes, sweater boxes, and the like. Other articles and products include rigid packaging, such as deli containers and lids including those used for dips, spreads, and pasta salads, dairy containers and lids including those used for storing cottage cheese, butter and yogurt, personal care products, and bottles and jars. In these and other uses the resins may be combined with other materials, such as particulate materials, including talc, calcium carbonate, wood, and fibers, such as glass or graphite fibers, to form composite materials. Examples of such composite materials include components for furniture, automotive components and building materials, particularly those used as lumber replacement.

The propylene-ethylene copolymers may also be used for other articles, such as films, coatings and fibers. In other embodiments the resins are also suitable for blow molding and thermoforming. Examples of such articles are bags, adhesives, yarns and fabrics, bottles and jars, and plates and cups.

The following examples serve to merely illustrate the invention and should not be construed as limiting its scope in any way. While the invention has been shown in only some of its forms, it should be apparent to those skilled in the art that it is not so limited, but is susceptible to various changes and modifications without departing from the scope of the invention. For example, modifications of ethylene content, xylene solubles content, haze performance, processing means and methods, catalyst selections, additives selections, and the like, not explicitly disclosed herein but falling within the generalized description, may be made without departing from the scope hereof. Accordingly, it is appropriate that the appended claims be construed broadly and in a manner consistent herewith.

EXAMPLES

Unless otherwise specified, all properties set forth in the following examples use the following testing methods. Tensile strength is measured according to ASTM D638-97. Flexural modulus is measured according to ASTM D790-97. Izod and Gardner impact strength are measured according to ASTM D256-97 and ASTM D1709, respectively. DSC recrystallization and melt peaks are measured according to ASTM D3417-97 and ASTM D418-97, respectively. Finally, haze values are measured according to ASTM D1003 on plaques formed using step chip molds of varying thickness having an SPI A-1 chrome finish.

Example 1 and Comparative Example 1

Clarified metallocene-catalyzed propylene-ethylene random copolymers (cmRCP) are compared with clarified Ziegler-Natta-catalyzed propylene-ethylene random copolymers (cZNRCP) of similar melt flow rate of less than 20 g/10 min and with varying ethylene content. Both the example and comparative copolymers are prepared using a conventional slurry polymerization reactor under substantially identical conditions of temperature, pressure, feed rate, reactant selection and proportion, and residence time. However, the polymerization to form the example employs as a catalyst that is a racemic solution of $Me_2Si(2\text{-}Me\text{-}4\text{-}PhInd)_2 ZrCl_2$ and $Me_2Si(2\text{-}Me\text{-}PhInd)_2ZrCl_2$, activated by 0.7/1 methylaluminoxane (MAO), supported on P10 silica, which is a chiral, stereo-rigid metallocene catalyst. In contrast, the catalysts used for the comparative resins are both conventional Ziegler-Natta catalysts. Resins designated with "EOD" are commercially available from Total USA; other designations are as supplied by their manufacturers. In each case a clarifying agent identified as Millad™ 3988, which is described by its manufacturer, Milliken Chemical, as an organic derivative of dibenzylidene sorbitol, is included in the formulation in the amounts shown in Table 1.

The additives are compounded with each copolymer via co-extrusion using a 1¼ inch WELEX™ extruder using a temperature profile of from 375 to 475° F. from the rear of the extruder to the die. Following extrusion the copolymers are each injection molded into tensile strength and Notched Izod test bars using ASTM methods D-638 and D-256, respectively. Step chip molds for haze measurements are also prepared using extruder temperature profiles which range, from the rear of the extruder to the die, from 400 to 450° F. (204-232° C.), with a mold temperature of 115-117° F. (46-47° C.) and a back pressure of 100 psi (0.7 mPa). The results are presented in Table 1 below.

TABLE 1

| | Sample No. | | | | | |
|---|---|---|---|---|---|---|
| | 1 (Ex.) EOD-0014 cmRCP | 2 (Ex.) EOD-0029 cmRCP | 3 (Ex.) EOD-0029 cmRCP | 4 (Ex.) EOD-0026 cmRCP | 5 (Comp.) 7525 MZ cZNRCP | 6 (Comp.) 8573 cZNRCP |
| MFI, g/10 min | 15 | 15 | 15 | 13 | 10 | 10 |
| Xylene Solubles Content, wt. % | 0.5-1 | 2-3 | 2-3 | 2-3 | 2-5 | 4.5-8 |
| Ethylene, wt. % | 1 | 2 | 3 | 5 | 2 | 4 |
| Millad ™ 3988, wt. % | 0.25 | 0.25 | 0.25 | 0.25 | 0.2 | 0.2 |
| Haze, % at given thickness: | | | | | | |
| 20 mil | 3 | 2 | 2 | 2 | 4 | 5.5 |
| 40 mil | 6 | 5 | 4 | 4 | 8 | 13 |
| 60 mil | 9 | 9 | 7 | 7 | 11 | 22 |
| 80 mil | 12 | 10 | 9 | 8 | 15 | 28 |
| Tensile Strength at break, psi (mPa) | 4800 (33) | 4400 (30) | 4000 (28) | 2700 (19) | 4200 (29) | — |
| 2% Flexural Modulus, 1 × $10^5$ psi (mPa) | 2.1 (1448) | 1.8 (1241) | 1.4 (965) | 0.7 (482) | 1.7 (1172) | — |
| Notched Izod, ft. lb./in. | 0.5 | 1.2 | 1.9 | 5.5 | 1.3 | 3.9 |

— Dashed line indicates no data available.

Example 2 and Comparative Example 2

Clarified metallocene-catalyzed propylene-ethylene random copolymers (cmRCP) are compared with clarified Ziegler-Natta-catalyzed propylene-ethylene random copolymers (cZNRCP) of similar melt flow rate of at least about 20 g/10 min and with varying ethylene content. The copolymers used for Samples 7 and 8, available from Total USA, are prepared as in Example 1, except using different metallocene catalysts. Additives, including clarifying agent, are the same as in Example 1 and Comparative Example 1, and compounding, extrusion, test bar formation, and all aspects of testing are carried out using the same procedures as in Example 1 and Comparative Example 1. The results are presented in Table 2 below.

TABLE 2

| | Sample | | |
|---|---|---|---|
| | 7 (Ex.) EOD-0031 cmRCP | 8 (Ex.) EOD-0031 cmRCP | 10 (Comp.) 7823-MZ cZNRCP |
| MFI, g/10 min | 30 | 32 | 29 |
| Xylene Solubles Content, wt. % | 0.5-1 | 0.5-1 | 4.5-6 |
| Ethylene, wt. % | 1 | 2 | 3 |
| Millad ™ 3988, wt. % | 0.21 | 0.22 | 0.19 |
| Haze, % at given thickness: | | | |
| 20 mil | 4 | 3 | 4 |
| 40 mil | 9 | 7 | 9 |
| 60 mil | 13 | 11 | 16 |
| 80 mil | 18 | 15 | 20 |
| Tensile Strength, psi (mPa) | 4600 (32) | 4200 (29) | 3400 (23) |
| Flexural Modulus, psi (1 × $10^5$) (mPa) | 2.0 (1379) | 1.7 (1172) | 3.4 (2344) |
| Notched Izod, ft. lb./in. | 0.4 | 0.7 | 1.1 |

It may be seen in the example that, as compared to Ziegler-Natta catalyzed polymer, the metallocene-catalyzed copolymer may be used effectively to prepare injection molded articles, in particular, having reduced haze at comparable stiffness. It follows, then, that when a comparable haze level is desirable or acceptable, the article may exhibit a desirably higher stiffness.

What is claimed is:
1. A process comprising:
supplying an isotactic propylene-ethylene random copolymer resin having an ethylene content of greater than about 3 percent by total weight of the copolymer, a melt flow rate of from about 0.1 g/10 min to about 150 g/10 min as determined by ASTM D-1238, Procedure B, and a xylene solubles content of less than about 4 percent by total weight of the copolymer; and injection molding the isotactic propylene-ethylene random copolymer resin to form an injection molded article, wherein the injection molded article exhibits a haze of less than about 13 percent, as determined by ASTM 01003, at a thickness of about 0.08 inch (2.03 mm).

2. The process of claim 1, wherein the isotactic propylene-ethylene random copolymer resin has an ethylene content of from about 3 to about 5 percent by total weight of the copolymer.

3. The process of claim 1, wherein the isotactic propylene-ethylene random copolymer resin has a xylene solubles content of from about 2 to about 3 percent by total weight of the copolymer.

4. The process of claim 1, wherein the isotactic propylene-ethylene random copolymer resin has a melt flow rate of less than about 20 as determined by ASTM D-1238, Procedure B, and wherein the injection molded article exhibits a haze of less than about 10 percent, as determined by ASTM 01003, at a thickness of about 0.08 inch (2.03 mm).

5. The process of claim 4, wherein the isotactic propylene-ethylene random copolymer resin has a melt flow rate of from about 7 to about 15 as determined by ASTM D-1238, Procedure B.

6. The process of claim 1, wherein the isotactic propylene-ethylene random copolymer resin has a melt flow rate of greater than about 20 g/10 min, as determined by ASTM D-1238, Procedure B.

7. The process of claim 6, wherein the injection molded article exhibits a flexural modulus of less than about $2.25 \times 10^5$ psi (1551 mPa), as determined by ASTM 0790-97.

* * * * *